United States Patent
Klimke et al.

(10) Patent No.: US 12,460,071 B2
(45) Date of Patent: Nov. 4, 2025

(54) POLYMER COMPOSITION FOR BLOW MOLDING

(71) Applicants: ABU DHABI POLYMERS CO. LTD (BOROUGE) L.L.C., Abu Dhabi (AE); BOREALIS AG, Vienna (AT)

(72) Inventors: Katja Klimke, Abu Dhabi (AE); Hans Jozef Francois Van Cauwenberghe, Abu Dhabi (AE); Philippe Abboud, Abu Dhabi (AE)

(73) Assignees: Abu Dhabi Polymers Co., Ltd (Borouge) L.L.C., Abu Dhabi (AE); Borealis AG, Vienna (AT)

( * ) Notice: Subject to any disclaimer, the term of this patent is extended or adjusted under 35 U.S.C. 154(b) by 817 days.

(21) Appl. No.: 17/289,078

(22) PCT Filed: Nov. 14, 2019

(86) PCT No.: PCT/EP2019/081327
§ 371 (c)(1),
(2) Date: Apr. 27, 2021

(87) PCT Pub. No.: WO2020/099564
PCT Pub. Date: May 22, 2020

(65) Prior Publication Data
US 2022/0010114 A1    Jan. 13, 2022

(30) Foreign Application Priority Data
Nov. 15, 2018  (EP) .................................... 18206389

(51) Int. Cl.
| | | |
|---|---|---|
| C08L 23/14 | (2006.01) | |
| B29C 49/00 | (2006.01) | |
| B29C 49/04 | (2006.01) | |
| B29K 23/00 | (2006.01) | |
| B29K 427/12 | (2006.01) | |
| B29K 427/18 | (2006.01) | |
| B29L 31/00 | (2006.01) | |

(52) U.S. Cl.
CPC .......... *C08L 23/14* (2013.01); *B29C 49/0005* (2013.01); *B29C 49/04* (2013.01); *B29K 2023/14* (2013.01); *B29K 2427/16* (2013.01); *B29K 2427/18* (2013.01); *B29K 2995/0022* (2013.01); *B29L 2031/7158* (2013.01); *C08L 2203/10* (2013.01); *C08L 2205/03* (2013.01)

(58) Field of Classification Search
CPC .. C08L 23/14; C08L 2203/10; C08L 2205/03; B29C 49/0005; B29C 49/04
See application file for complete search history.

(56) References Cited

U.S. PATENT DOCUMENTS

| | | |
|---|---|---|
| 3,324,093 A | 6/1967 | Alleman |
| 3,405,109 A | 10/1968 | Rohlfing |
| 4,543,399 A | 9/1985 | Jenkins, III et al. |
| 4,582,816 A | 4/1986 | Miro |
| 4,621,952 A | 11/1986 | Aronson |
| 5,234,879 A | 8/1993 | Garoff et al. |
| 5,391,654 A | 2/1995 | Ahvenainen |
| 2005/0101722 A1 | 5/2005 | Briers et al. |
| 2007/0009691 A1 | 1/2007 | Barre et al. |
| 2007/0185247 A1* | 8/2007 | Danielson ................ C08K 5/00 524/495 |
| 2009/0306271 A1* | 12/2009 | Ommundsen ......... C08L 23/142 264/572 |
| 2010/0301525 A1 | 12/2010 | Price et al. |
| 2016/0145368 A1 | 5/2016 | Okanishi |
| 2017/0247526 A1 | 8/2017 | Botros et al. |
| 2017/0341269 A1 | 11/2017 | Gabriels |

FOREIGN PATENT DOCUMENTS

| | | |
|---|---|---|
| EP | 188125 A2 | 7/1986 |
| EP | 250169 A2 | 12/1987 |
| EP | 479186 A2 | 4/1992 |
| EP | 579426 A1 | 1/1994 |
| EP | 699213 B1 | 5/1994 |
| EP | 0696293 A1 | 11/1994 |
| EP | 991684 B1 | 6/1998 |
| EP | 0887379 A1 | 12/1998 |
| EP | 887381 A1 | 12/1998 |
| EP | 1310295 A1 | 5/2003 |
| EP | 1415999 A1 | 5/2004 |
| EP | 1580207 A1 | 9/2005 |

(Continued)

OTHER PUBLICATIONS

Office Action for Chinese Patent Application No. 201980072537.X with English translation dated Jul. 4, 2022, 18 pages.
English Translation of Office Action Korean Patent Application No. 10-2021-701727 dated Nov. 22, 2022, 8 pages.
International Search Report and Written Opinion for PCT/EP2019/081327 mailed Jan. 20, 2020, 13 pages.
European Search Report for European Patent Application No. 18206389 mailed May 21, 2019, 7 pages.

*Primary Examiner* — John E Uselding
(74) *Attorney, Agent, or Firm* — LOWENSTEIN SANDLER LLC

(57) ABSTRACT

A polymer composition is provided, where the polymer composition includes
(A) a polyolefin;
(B) one or more impact modifier(s);
(C) one or more fluoropolymer(s);
(D) one or more clarifying agent(s); and
(E) one or more dispersing agent(s) in an amount of equal to or more than 100 ppm, based on the total weight amount of the polymer composition.

An article including the polymer composition and the use of the polymer composition for reducing haze and improving gloss of an extrusion blow molded (EBM) bottle are also provided.

10 Claims, No Drawings

(56) References Cited

FOREIGN PATENT DOCUMENTS

| | | |
|---|---|---|
| EP | 1591460 A1 | 11/2005 |
| EP | 1739103 A1 | 1/2007 |
| EP | 1752462 A1 | 2/2007 |
| EP | 3012292 A1 | 4/2016 |
| KR | 10-2011-0104031 | 9/2011 |
| KR | 20170092644 A | 8/2017 |
| WO | 9212182 A1 | 7/1992 |
| WO | 9219653 A1 | 11/1992 |
| WO | 9219658 A1 | 11/1992 |
| WO | 9425495 A1 | 11/1994 |
| WO | 9512622 A1 | 5/1995 |
| WO | 9618662 A1 | 6/1996 |
| WO | 9632423 A1 | 10/1996 |
| WO | 9728170 A1 | 8/1997 |
| WO | 9832776 A1 | 7/1998 |
| WO | 9933843 A1 | 7/1999 |
| WO | 9961489 A1 | 12/1999 |
| WO | 0026258 A1 | 5/2000 |
| WO | 0029452 A1 | 5/2000 |
| WO | 200069967 A1 | 11/2000 |
| WO | 2003002639 | 1/2003 |
| WO | 03010208 A1 | 2/2003 |
| WO | 03051514 A1 | 6/2003 |
| WO | 03051934 A2 | 6/2003 |
| WO | 2004085499 A2 | 10/2004 |
| WO | 2007025640 A1 | 3/2007 |
| WO | 2010081753 A1 | 7/2010 |
| WO | 2010138172 A1 | 12/2010 |
| WO | 2011057926 A1 | 5/2011 |
| WO | 2014203727 A1 | 12/2014 |
| WO | WO-2016198273 A1 * 12/2016 | ............. B32B 27/08 |

* cited by examiner

POLYMER COMPOSITION FOR BLOW MOLDING

CROSS-REFERENCE TO RELATED APPLICATION(S)

This application is a national phase of International Application No. PCT/EP2019/081327, filed on Nov. 14, 2019, which claims the benefit of European Patent Application No. 18206389.1, filed on Nov. 15, 2018. The contents of these applications are hereby incorporated by reference in their entirety.

FIELD OF THE INVENTION

The present application relates to a polymer composition comprising a polyolefin, one or more impact modifier(s), one or more fluoropolymer(s), one or more clarifying agent(s) and one or more dispersing agent(s) suitable for the production of a blow molded article, such as an extrusion blow molded (EBM) bottle.

BACKGROUND ART

It is well known in the polymer field that different applications require specifically tailored polymers to achieve the individual demanding properties. For instance a polymer used for injection molding must necessarily have other properties as a polymer used for blow molding.

The extrusion blow molding process for instance is a very special process that allows in a flexible and cheap way the preparation of different kind of bottles with respect to size and shape. Main drawback in this process is that the solidification step is very special compared to normal injection molding.

In the extrusion blow molding (EBM) process a polymer melt is first extruded through a tubular die into air forming a polymer tube, subsequently blowing up said polymer tube (typically called "parison" in this technical field) until the outside of the tube reaches the boundaries of the mold. To cover the wall of the mold fully with the blown up polymer tube is rather difficult compared to injection molding because the air between polymer tube and mold has to be removed totally which is a demanding process step. Further the inside of the polymer tube is not in contact with the mold and therefore there is only little possibility to influence the inner surface structure of the tube. As a consequence thereof extrusion blown molded articles, like bottles, normally show inferior optical properties compared to any injection molded articles. For instance, the surface property inside and/or outside of extrusion blown bottles is typically non-uniform (flow lines, melt fracture) leading to lower overall gloss and transparency compared to injection molded bottles or injection stretched blown molded articles (ISBM).

Thus there still the demand for EBM products with improved optical properties.

Further the EBM products shall have good mechanical properties such as impact properties and processing properties.

WO 2010/138172 discloses a polymer composition suitable for the production of EBM products which is based on a thermoplastic polymer and comprises a fluoropolymer and a clarifying agent comprising an acetal compound, which is a condensation product of a polyhydric alcohol and an aromatic aldehyde, which shows improved optical properties. For these polymer compositions, however, the presence of dispersing agents is not recommended.

Thus, the object of the present invention is to provide a polymer composition which enables inter alia the preparation of bottles by an extrusion blow molding process, wherein the bottles are featured by good optical properties, mechanical properties and processing properties.

It has surprisingly been found that the optical properties of a polymer composition suitable for the production of EBM products can be significantly improved by adding one or more clarifying agent(s), one or more fluoropolymer(s) and one or more dispersing agent(s) in an amount of equal to or more than 100 ppm, based on the total weight amount of the polymer composition, to a polymer composition comprising a polyolefin and an impact modifier.

SUMMARY OF THE INVENTION

The present invention relates to a polymer composition comprising
(A) a polyolefin;
(B) one or more impact modifier(s);
(C) one or more fluoropolymer(s);
(D) one or more clarifying agent(s); and
(E) one or more dispersing agent(s) in an amount of equal to or more than 100 ppm, based on the total weight amount of the polymer composition.

Further, the present invention relates to an article, such as a blow molded article, especially an extrusion blow molded (EBM) bottle, comprising the polymer composition as defined above or below.

Still further, the present invention relates to the use of the polymer composition as defined above or below for reducing haze and improving gloss of an extrusion blow molded (EBM) bottle.

Definitions

An impact modifier is a polymer suitable for improving the impact properties of a polymer composition.

A clarifying agent typically consists of small molecules that exhibit monotectic phase behaviour with the polymer matrix, dissolving at elevated temperatures in the polymer melt and crystallizing into nanofibrils or a nanofibrillar network upon quenching, thus providing a very large surface area for the polymer matrix to nucleate upon. Consequently, the clarifying agent increases the nucleation density thereby reducing the size of the spherulites that are responsible for the scattering of light resulting in a more transparent material.

A dispersing agent typically consists of molecules having polar groups and non-polar groups which improves the dispersion of a polar polymer, such as the fluoropolymer, in a non-polar polymer, such as the polyolefin. Dispersing agents are also known in the art e.g. as interfacial agents, coupling agents or compatibilizers.

A propylene based polymer is a polymer comprising propylene monomer units in a total amount of at least 50 mol %.

A propylene homopolymer denotes a polymer consisting essentially of propylene monomer units. Due to the requirements of large-scale polymerization it may be possible that the propylene homopolymer includes minor amounts of comonomer units, which is usually below 0.1 mol %, preferably below 0.05 mol %, most preferably below 0.01 mol % of the propylene homopolymer.

A polymer is denoted propylene copolymer if the polymer is derived from propylene monomer units and at least one alpha-olefin comonomer. The alpha-olefin comonomer preferably is selected from ethylene and/or alpha-olefins having from 4 to 12 carbon atoms, more preferably from ethylene and/or alpha-olefins having from 4 to 8 carbon atoms, still more preferably from ethylene and/or alpha-olefins having from 4 to 6 carbon atoms and most preferably from ethylene.

A propylene random copolymer is a propylene copolymer as defined above in which the comonomer units are randomly distributed within the polymer chain. Propylene random copolymers thereby do not include an elastomeric phase.

An ethylene homopolymer denotes a polymer consisting essentially of ethylene monomer units. Due to the requirements of large-scale polymerization it may be possible that the ethylene homopolymer includes minor amounts of comonomer units, which is usually below 0.1 mol %, preferably below 0.05 mol %, most preferably below 0.01 mol % of the ethylene homopolymer.

A polymer is denoted ethylene copolymer if the polymer is derived from ethylene monomer units and at least one alpha-olefin comonomer. The alpha-olefin comonomer preferably is selected from alpha-olefins having from 3 to 12 carbon atoms, more preferably from alpha-olefins having from 4 to 8 carbon atoms, still more preferably from alpha-olefins having from 4 to 6 carbon atoms. Suitable alpha-olefin comonomer species are 1-butene, 1-hexene, 4-methyl-1-pentene, 1-octene or their mixtures. Preferred are 1-butene and 1-hexene.

A polymer comprising more than one fraction differing from each other in at least one property, such as weight average molecular weight or comonomer content, is called multimodal. If the multimodal polymer includes two different fractions, it is called bimodal and, correspondingly, if it includes three different fraction, it is called trimodal. The form of the molecular weight curve, i.e. the appearance of the graph of the polymer weight fraction as function of its molecular weight, of such a multimodal polymer will show two or more distinct maxima depending on the modality or at least be distinctly broadened in comparison with the curves of the individual fractions.

The amount disclosed herein relate to weight amounts in % by weight or wt %, if not stated otherwise.

DETAILED DESCRIPTION

The polymer composition according to the present invention comprises a polyolefin (A), one or more impact modifier(s) (B), one or more fluoropolymer(s) (B), one or more clarifying agent(s) (D) and one or more dispersing agent(s) (E).

Polyolefin (A)

The polyolefin (A) preferably is a propylene based polymer such as a propylene homopolymer, a propylene random copolymer or a heterophasic propylene copolymer.

It is preferred that the polyolefin (A) is a propylene random copolymer, more preferably a multimodal propylene random copolymer.

The comonomer(s) of the propylene random copolymer are preferably selected from ethylene and/or alpha-olefins having from 4 to 12 carbon atoms, more preferably from ethylene and/or alpha-olefins having from 4 to 8 carbon atoms, still more preferably from ethylene and/or alpha-olefins having from 4 to 6 carbon atoms and most preferably from ethylene.

The amount of comonomer units in the propylene random copolymer is preferably in the range of 1.0 to 7.0 wt.-%, more preferably 1.5 to 6.0 wt.-%, still more preferably 2.0 to 5.5 wt.-%.

The polyolefin (A) preferably has a density in the range of from 890 $kg/m^3$ to 920 $kg/m^3$, more preferably from 900 $kg/m^3$ to 910 $kg/m^3$.

The polyolefin (A) preferably has a melt flow rate $MFR_2$ (2.16 kg, 230° C.) of from 1.0 g/10 min to 5.0 g/10 min, more preferably of from 1.2 g/10 min to 2.5 g/10 min.

The polyolefin (A) preferably is a multimodal propylene random copolymer, more preferably a bimodal propylene random copolymer.

Thus the propylene random copolymer preferably comprises two fractions which differ in their comonomer content, like ethylene content, wherein the first fraction is present from 40 to 60 wt.-% and the second fraction from 60 to 40 wt.-%. In such a case the propylene random copolymer comprises at least two fractions, more preferably consists of two fractions, that have a comonomer content, like ethylene content, which differ of at least 2.0 wt.-%, more preferably differ of at least 2.5 wt.-%. On the other hand the difference in the comonomer content in the two fractions should be not too high, i.e. not higher than 6.0 wt.-%, preferably not higher than 5.0 wt %, to avoid any separation tendencies. Thus it is appreciated that the propylene random copolymer comprises at least two fractions, more preferably consists of two fractions, that have comonomer contents which differ of 2.0 to 6.0 wt.-%, more preferably of 2.5 to 5.0 wt.-%. Accordingly in one embodiment the propylene random copolymer consists of a first fraction being a propylene homopolymer and a second fraction being a propylene copolymer having a comonomer content, preferably ethylene content, of at least 2.0 wt.-%, more preferably of at least 3.0 wt.-%, like at least 3.5 wt.-%.

In particular suitable propylene random copolymers are those as for instance described in EP 1 580 207 A1 and WO 2003/002639 A1.

The propylene random copolymer may be prepared by polymerizing, in a slurry reactor, for example a loop reactor, propylene optionally together with at least one comonomer selected from ethylene or alpha-olefins having from 4 to 12 carbon atoms, in the presence of a polymerization catalyst to produce a part of the propylene random copolymer. This part is then transferred to a subsequent gas phase reactor, wherein in the gas phase reactor propylene is reacted in the presence of at least one, preferably one comonomer selected from ethylene or alpha-olefins having from 4 to 12 carbon atoms in order to produce a further part in the presence of the reaction product of the first step. This reaction sequence provides a reactor blend of parts (i) and (ii) constituting a propylene random copolymer. It is of course possible by the present invention that the first reaction is carried out in a gas phase reactor while the second polymerization reaction is carried out in a slurry reactor, for example a loop reactor. It is furthermore also possible to reverse the order of producing parts (i) and (ii), which has been described above in the order of first producing part (i) and then producing part (ii). The above-discussed process, comprising at least two polymerization steps, is advantageous in view of the fact that it provides easily controllable reaction steps enabling the preparation of a desired reactor blend. The polymerization steps may be adjusted, for example by appropriately selecting monomer feed, comonomer feed, hydrogen feed, temperature and pressure in order to suitably adjust the properties of the polymerization products obtained. It is in particular possible to obtain a multimodality, preferably the bimodality, of the propylene random copolymer, with respect to the comonomer, like ethylene, distribution as well as with respect to the molecular weights and $MFR_2$ (230° C.) values during said multistage polymerization procedures.

Such a process can be carried out using any suitable catalyst for the preparation of the propylene random copolymer. Preferably, the process as discussed above is carried out using a Ziegler-Natta catalyst, in particular a high yield Ziegler-Natta catalyst (so-called fourth and fifth generation type to differentiate from low yield, so called second generation Ziegler-Natta catalysts). A suitable Ziegler-Natta catalyst to be employed in accordance with the present invention comprises a catalyst component, a co-catalyst component and at least one electron donor (internal and/or external electron donor, preferably at least one external donor). Preferably, the catalyst component is a Ti—Mg-based catalyst component and typically the co-catalyst is an Al-alkyl based compound. Suitable catalysts are in particular disclosed in U.S. Pat. No. 5,234,879, WO 92/19653, WO 92/19658 and WO 99/33843.

Preferred external donors are the known silane-based donors, such as dicyclopentyl dimethoxy silane or cyclohexyl methyldimethoxy silane.

One embodiment of a process as discussed above is a loop-gas phase process, known as Borstar® technology, described for example in EP 0 887 379 A1 and WO 92/12182.

With respect to the above-mentioned preferred slurry-gas phase process, the following general information can be provided with respect to the process conditions.

Temperature of from 40 to 110° C., preferably between 60 and 100° C., in particular between 80 and 90° C., with a pressure in the range of from 20 to 80 bar, preferably 30 to 60 bar, with the option of adding hydrogen in order to control the molecular weight. The reaction product of the slurry polymerization, which preferably is carried out in a loop reactor, is then transferred to the subsequent gas phase reactor, wherein the temperature preferably is within the range of from 50 to 130° C., more preferably 80 to 100° C., at a pressure in the range of from 5 to 50 bar, preferably 15 to 35 bar, again with the option of adding hydrogen in order to control the molecular weight.

The residence time can vary in the reactor zones identified above. In embodiments, the residence time in the slurry reaction, for example the loop reactor, is in the range of from 0.5 to 5 hours, for example 0.5 to 2 hours, while the residence time in the gas phase reactor generally will be from 1 to 8 hours.

The properties of the propylene random copolymer produced with the above-outlined process may be adjusted and controlled with the process conditions as known to the skilled person, for example by one or more of the following process parameters: temperature, hydrogen feed, comonomer feed, propylene feed, catalyst, type and amount of external donor, split between two or more components of a multimodal polymer.

The polyolefin (A) as defined above is preferably present the polymer composition in an amount of equal to or more than 85 wt %, more preferably from 85 wt % to 96 wt %, still more preferably from 90 wt % to 95 wt %, based on the total weight amount of the polymer composition.

Impact Modifier (B)

The one or more impact modifier(s) (B) is/are preferably selected from the group consisting of ethylene-propylene rubber (EPR), ethylene-propylene-diene monomer (EPDM), polyethylene and plastomer.

It is preferred that the one or more impact modifier(s) (B) is selected from polyethylenes such as a high density polyethylene, a medium density polyethylene or a linear low density polyethylene.

Preferably the one or more impact modifier(s) (B) is a multimodal copolymer of ethylene with one or more comonomer units selected from alpha-olefins having from 3 to 12 carbon atoms.

The one or more comonomer units preferably are selected from alpha-olefins having from 3 to 12 carbon atoms, more preferably from alpha-olefins having from 4 to 8 carbon atoms, still more preferably from alpha-olefins having from 4 to 6 carbon atoms. Suitable alpha-olefin comonomer units are 1-butene, 1-hexene, 4-methyl-1-pentene, 1-octene or their mixtures. Especially preferred are 1-butene and 1-hexene.

It is especially preferred that the one or more impact modifier(s) (B) is a multimodal copolymer of ethylene with at least two different comonomer units selected from alpha-olefins having from 3 to 12 carbon atoms as defined above.

Mostly preferred the one or more impact modifier(s) (B) is a multimodal copolymer of ethylene with 1-butene and 1-hexene comonomer units.

It is preferred that the multimodal copolymer of ethylene with at least two different comonomer units selected from alpha-olefins having from 3 to 12 carbon atoms comprises two ethylene polymer fractions which differ in their weight average molecular weight.

Thereby, both ethylene polymer fractions can include the same comonomers or can differ in their comonomers.

In one embodiment the first and second polymer fraction both contain at least two different comonomer units. Thereby, the first and second polymer fraction do not differ in their comonomer units.

In another embodiment the first ethylene polymer fraction is an ethylene homopolymer and the second ethylene polymer fraction is an ethylene copolymer with at least two, preferably two different comonomer units.

In still another embodiment the first ethylene polymer fraction is an ethylene copolymer with at least one, preferably one comonomer units and the second polymer fraction an ethylene copolymer with at least one, preferably one comonomer units, which differs from the comonomer units of the first fraction.

Said latter embodiment is especially preferred.

It is mostly preferred that the multimodal copolymer of ethylene with at least two different comonomer units comprises a 1-butene/ethylene copolymer fraction and a 1-hexene/ethylene copolymer fraction.

The multimodal copolymer of ethylene with at least two different comonomer units selected from alpha-olefins having from 3 to 12 carbon atoms is preferably a linear low density polyethylene (LLDPE) which has a well known meaning.

The density of the multimodal copolymer of ethylene with at least two different comonomer units selected from alpha-olefins having from 3 to 12 carbon atoms is preferably from 910 to 935 kg/m$^3$, preferably from 915 to 930 kg/m$^3$.

The multimodal copolymer of ethylene with at least two different comonomer units selected from alpha-olefins having from 3 to 12 carbon atoms is preferably produced using a coordination catalyst. More preferably, the first and second ethylene polymer fractions are preferably produced using a single site catalyst, which includes metallocene catalyst and non-metallocene catalyst, which all terms have a well-known meaning in the art. The term "single site catalyst" means herein the catalytically active metallocene compound or complex combined with a cocatalyst. The metallocene compound or complex is referred herein also as organometallic compound.

The organometallic compound comprises a transition metal (M) of Group 3 to 10 of the Periodic Table (IUPAC 2007) or of an actinide or lanthanide.

The term "an organometallic compound" in accordance with the present invention includes any metallocene or non-metallocene compound of a transition metal which bears at least one organic (coordination) ligand and exhibits the catalytic activity alone or together with a cocatalyst. The transition metal compounds are well known in the art and the present invention covers compounds of metals from Group 3 to 10, e.g. Group 3 to 7, or 3 to 6, such as Group 4 to 6 of the Periodic Table, (IUPAC 2007), as well lanthanides or actinides.

In an embodiment the organometallic compound has the following formula (I):

wherein
"M" is a transition metal (M) transition metal (M) of Group 3 to 10 of the Periodic Table (IUPAC 2007),
each "X" is independently a monoanionic ligand, such as a σ-ligand,
each "L" is independently an organic ligand which coordinates to the transition metal "M",
"R" is a bridging group linking said organic ligands (L),
"m" is 1, 2 or 3, preferably 2
"n" is 0, 1 or 2, preferably 1,
"q" is 1, 2 or 3, preferably 2 and
m+q is equal to the valency of the transition metal (M).

"M" is preferably selected from the group consisting of zirconium (Zr), hafnium (Hf), or titanium (Ti), more preferably selected from the group consisting of zirconium (Zr) and hafnium (Hf). "X" is preferably a halogen, most preferably Cl.

Most preferably the organometallic compound is a metallocene complex which comprises a transition metal compound, as defined above, which contains a cyclopentadienyl, indenyl or fluorenyl ligand as the substituent "L". Further, the ligands "L" may have substituents, such as alkyl groups, aryl groups, arylalkyl groups, alkylaryl groups, silyl groups, siloxy groups, alkoxy groups or other heteroatom groups or the like. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103

Most preferred single site catalyst is a metallocene catalyst which means the catalytically active metallocene complex, as defined above, together with a cocatalyst, which is also known as an activator. Suitable activators are metal alkyl compounds and especially aluminium alkyl compounds known in the art. Especially suitable activators used with metallocene catalysts are alkylaluminium oxy-compounds, such as methylalumoxane (MAO), tetraisobutylalumoxane (TIBAO) or hexaisobutylalumoxane (HIBAO).

More preferably the first and second ethylene polymer fractions of the multimodal copolymer of ethylene with at least two different comonomer units selected from alpha-olefins having from 3 to 12 carbon atoms are produced using, i.e. in the presence of, the same metallocene catalyst.

The multimodal copolymer of ethylene with at least two different comonomer units selected from alpha-olefins having from 3 to 12 carbon atoms may be produced in any suitable polymerization process known in the art. Into the polymerization zone is also introduced ethylene, optionally an inert diluent, and optionally hydrogen and/or comonomer.

The first ethylene polymer fraction is preferably produced in a first polymerization zone and the second ethylene polymer fraction is produced in a second polymerization zone. The first polymerization zone and the second polymerization zone may be connected in any order, i.e. the first polymerization zone may precede the second polymerization zone, or the second polymerization zone may precede the first polymerization zone or, alternatively, polymerization zones may be connected in parallel. However, it is preferred to operate the polymerization zones in cascaded mode. The polymerization zones may operate in slurry, solution, or gas phase conditions or their combinations. Suitable processes comprising cascaded slurry and gas phase polymerization stages are disclosed, among others, in WO-A-92/12182 and WO-A-96/18662.

It is often preferred to remove the reactants of the preceding polymerization stage from the polymer before introducing it into the subsequent polymerization stage.

This is preferably done when transferring the polymer from one polymerization stage to another.

The catalyst may be transferred into the polymerization zone by any means known in the art. For example, it is possible to suspend the catalyst in a diluent and maintain it as homogeneous slurry, to mix the catalyst with a viscous mixture of grease and oil and feed the resultant paste into the polymerization zone or to let the catalyst settle and introduce portions of thus obtained catalyst mud into the polymerization zone.

The polymerization, preferably of the first ethylene polymer fraction, in the first polymerization zone is preferably conducted in slurry. Then the polymer particles formed in the polymerization, together with the catalyst fragmented and dispersed within the particles, are suspended in the fluid hydrocarbon. The slurry is agitated to enable the transfer of reactants from the fluid into the particles.

The polymerization usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons and preferred diluent is propane.

The ethylene content in the fluid phase of the slurry may be from 2 to about 50% by mole, preferably from about 2 to about 20% by mole and in particular from about 3 to about 12% by mole.

The temperature in the slurry polymerization is typically from 50 to 115° C., preferably from 60 to 110° C. and in particular from 70 to 100° C. The pressure is from 1 to 150 bar, preferably from 10 to 100 bar.

The slurry polymerization may be conducted in any known reactor used for slurry polymerization. Such reactors include a continuous stirred tank reactor and a loop reactor. It is especially preferred to conduct the polymerization in loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

It is sometimes advantageous to conduct the slurry polymerization above the critical temperature and pressure of the fluid mixture. Such operation is described in U.S. Pat. No. 5,391,654. In such operation the temperature is typically from 85 to 110° C., preferably from 90 to 105° C. and the pressure is from 40 to 150 bar, preferably from 50 to 100 bar.

The slurry may be withdrawn from the reactor either continuously or intermittently. A preferred way of intermittent withdrawal is the use of settling legs where slurry is allowed to concentrate before withdrawing a batch of the concentrated slurry from the reactor. The continuous withdrawal is advantageously combined with a suitable concentration method, e.g. as disclosed in EP-A-1310295 and EP-A-1591460.

Hydrogen may be fed into the reactor to control the molecular weight of the polymer as known in the art. Furthermore, one or more alpha-olefin comonomers are added into the reactor e.g. to control the density of the polymer product. The actual amount of such hydrogen and comonomer feeds depends on the catalyst that is used and the desired melt index (or molecular weight) and density (or comonomer content) of the resulting polymer.

The polymerization, preferably of the second ethylene polymer fraction, in the second polymerization zone is preferably conducted in gas phase, preferably in a fluidized bed reactor, in a fast fluidized bed reactor or in a settled bed reactor or in any combination of these. The polymerization in the second polymerization zone is more preferably conducted in a fluidized bed gas phase reactor, wherein ethylene is polymerized together with at least one comonomer in the presence of a polymerization catalyst and, preferably in the presence of the reaction mixture from the first polymerization zone comprising the first ethylene polymer fraction in an upwards moving gas stream. The reactor typically contains a fluidized bed comprising the growing polymer particles containing the active catalyst located above a fluidization grid.

The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. One or more of the abovementioned components may be continuously added into the fluidization gas to compensate for losses caused, among other, by reaction or product withdrawal.

The fluidization gas passes through the fluidized bed. The superficial velocity of the fluidization gas must be higher that minimum fluidization velocity of the particles contained in the fluidized bed, as otherwise no fluidization would occur. On the other hand, the velocity of the gas should be lower than the onset velocity of pneumatic transport, as otherwise the whole bed would be entrained with the fluidization gas.

When the fluidization gas is contacted with the bed containing the active catalyst the reactive components of the gas, such as monomers and chain transfer agents, react in the presence of the catalyst to produce the polymer product. At the same time the gas is heated by the reaction heat.

The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerizable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidization gas stream to compensate for the losses caused by the reaction and product withdrawal. It is generally known to analyze the composition of the fluidization gas and introduce the gas components to keep the composition constant. The actual composition is determined by the desired properties of the product and the catalyst used in the polymerization.

The catalyst may be introduced into the reactor in various ways, either continuously or intermittently. Where the gas phase reactor is a part of a reactor cascade the catalyst is usually dispersed within the polymer particles from the preceding polymerization stage. The polymer particles may be introduced into the gas phase reactor as disclosed in EP-A-1415999 and WO-A-00/26258. Especially if the preceding reactor is a slurry reactor it is advantageous to feed the slurry directly into the fluidized bed of the gas phase reactor as disclosed in EP-A-887379, EP-A-887380, EP-A-887381 and EP-A-991684.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

Also antistatic agent(s), such as water, ketones, aldehydes and alcohols, may be introduced into the gas phase reactor if needed. The reactor may also include a mechanical agitator to further facilitate mixing within the fluidized bed. Typically the fluidized bed polymerization reactor is operated at a temperature within the range of from 50 to 100° C., preferably from 65 to 90° C. The pressure is suitably from 10 to 40 bar, preferably from 15 to 30 bar.

The polymerization of first and second ethylene polymer fractions in the first and second polymerization zones may be preceded by a prepolymerization step. The purpose of the prepolymerization is to polymerize a small amount of polymer onto the catalyst at a low temperature and/or a low monomer concentration. By prepolymerization it is possible to improve the performance of the catalyst in slurry and/or modify the properties of the final polymer. The prepolymerization step may be conducted in slurry or in gas phase. Preferably prepolymerization is conducted in slurry, preferably in a loop reactor. The prepolymerization is then preferably conducted in an inert diluent, preferably the diluent is a low-boiling hydrocarbon having from 1 to 4 carbon atoms or a mixture of such hydrocarbons.

The temperature in the prepolymerization step is typically from 0 to 90° C., preferably from 20 to 80° C. and more preferably from 40 to 70° C.

The pressure is not critical and is typically from 1 to 150 bar, preferably from 10 to 100 bar.

The catalyst components are preferably all introduced to the prepolymerization step. Preferably the reaction product of the prepolymerization step is then introduced to the first polymerization zone. Also preferably, as mentioned above, the prepolymer component is calculated to the amount of the first ethylene polymer fraction.

It is within the knowledge of a skilled person to adapt the polymerization conditions in each step as well as feed streams and resident times to obtain the multimodal copolymer of ethylene with at least two different comonomer units selected from alpha-olefins having from 3 to 12 carbon atoms.

It is preferred that the polymer composition according to the present invention comprises one impact modifier (B).

The one or more impact modifier(s) (B), preferably one impact modifier (B), as defined above is/are preferably present the polymer composition in an amount of from 4.0 to 6.0 wt %, more preferably of from 4.5 to 5.5 wt %, based on the total weight amount of the polymer composition.

Fluoropolymer (C)

The one or more fluoropolymer(s) (C) present in the polymer composition can be any suitable fluoropolymer such as a fluoroplastic or fluoroelastomer.

Suitable fluoropolymer(s) (C) include, but are not limited to, polymers made from at least one monomer selected from the group consisting of vinylidene fluoride, hexafluoropropylene, chlorotrifluoroethylene, tetrafluoroethylene, perfluoro(alkyl vinyl ether), and combinations thereof.

Preferably, the one or more fluoropolymer(s) is/are a polymer selected from the group consisting of (i) copolymers of vinylidene fluoride and a comonomer selected from the group consisting of hexafluoropropylene, chlorotrifluoroethylene, 1-hydropentafluoropropylene, and 2-hydropentafluoropropylene; (ii) terpolymers of vinylidene fluoride, tetrafluoroethylene, and a comonomer selected from the group consisting hexafluoropropylene, 1-hydropentafluoropropylene, and 2-hydropentafluoropropylene; (iii) copolymers of tetrafluoroethylene and propylene; (iv) copolymers of tetrafluoroethylene, propylene, and vinylidene fluoride; and (v) combinations of two or more of (i)-(iv).

It is especially preferred that the one or more fluoropolymer (C) is a terpolymer of vinylidene fluoride, tetrafluoroethylene, and hexafluoropropylene.

The one or more fluoropolymer(s) (C) can have any suitable molecular weight. However, in certain possibly preferred embodiments, the one or more fluoropolymer(s) (C) has a relatively high molecular weight. As will be understood by those of ordinary skill in the art, the molecular weight of a polymer, including the one or more fluoropolymer(s) (C), can be measured and expressed in many different ways, though measurements based on correlations between average molecular weight and one or more physical properties of the polymer are commonly used due to the complexity of measuring the molecular weight of the polymer chains in the polymer system. One such measurement is based on the correlation between average molecular weight and the rate of flow of the molten polymer (e.g., melt flow index (MFI)). Another such measurement is based on the correlation between average molecular weight and the shearing torque resisting rotation of a cylindrical metal disk or rotor embedded in the polymer (i.e., Mooney viscosity).

The one or more fluoropolymer(s) (C) can have any suitable melt flow rate (MFR). Preferably, the fluoropolymer has a melt flow rate MFR$_5$ (265° C., 5 kg) of 2 g/10 min or more, more preferably 3 g/10 min or more, still more preferably 4 g/10 min or more, and most preferably 5 g/10 min or more. Preferably, the fluoropolymer has a melt flow rate MFR$_5$ (265° C., 5 kg) of from 2 to 50 g/10 min, more preferably from 3 to 40 g/10 min, still more preferably from 4 to 30 g/10 min and most preferably from 5 to 25 g/10 min.

The one or more fluoropolymer(s) (C) can have any suitable Mooney viscosity. It is preferred that the Mooney viscosity of the one or more fluoropolymer(s) (C) is 25 or more, more preferably 28 or more, as measured in accordance with ASTM Standard D1646-07 at 121° C., large rotor, condition ML 1+10 minutes. It is further preferred that the Mooney viscosity of the one or more fluoropolymer(s) (C) is 80 or less, more preferably 70 or less, still more preferably 60 or less, even more preferably 50 or less, and most preferably 40 or less, such as 38 or less, as measured in accordance with ASTM Standard D1646-07 at 121° C., large rotor, condition ML 1+10 minutes. Thus, the Mooney viscosity of the fluoropolymer is usually from 25 to 80, preferably from 25 to 70, more preferably from 25 to 60, still more preferably from 25 to 50, even more preferably from 25 to 40 and most preferably from 28 to 38, as measured in accordance with ASTM Standard D1646-07 at 121° C., large rotor, condition ML 1+10 minutes.

The one or more fluoropolymer(s) (C) can include multimodal fluoropolymers. As utilized herein, the term "multimodal" is used to refer to a fluoropolymer that has at least two components of discrete and different molecular weights (e.g., discrete and different average molecular weights). Suitable multimodal fluoropolymer are described, for example, in WO 2000/69967. In such multimodal fluoropolymers, each of the components may be amorphous or semi-crystalline, or one component may be amorphous and another component semi-crystalline.

It is preferred that the polymer composition according to the present invention comprises one fluoropolymer (C).

The one or more fluoropolymer(s) (C), preferably one fluoropolymer (C), as defined above is/are preferably present the polymer composition in an amount of from 100 ppm to 1000 ppm, more preferably of from 150 ppm to 750 ppm, still more preferably of from 200 ppm to 500 ppm and most preferably of from 250 ppm to 400 ppm, based on the total weight amount of the polymer composition.

Clarifying Agent (D)

The one or more clarifying agent(s) (D) present in the polymer composition is preferably selected from the group consisting of sorbitol based clarifying agents.

The one or more clarifying agent(s) (D) preferably has/have the structure,

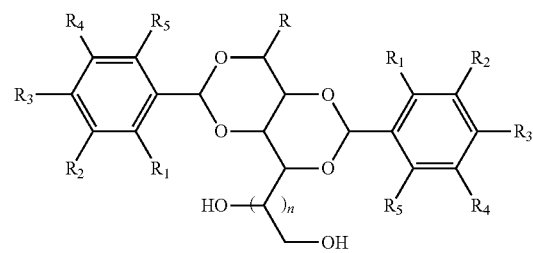

wherein R is independently selected from the group consisting of hydrogen, alkyl, alkenyl, alkynyl, alkoxy, aryloxy, hydroxyalkyl, alkyl halide cycloalkyl, cycloalkenyl, aryl, substituted aryl, and combinations thereof, and wherein $R_1$ to $R_5$ are independently selected from the group consisting of hydrogen, alkyl, alkenyl, alkynyl, alkoxy, aryloxy, hydroxyalkyl, cycloalkyl, cycloalkenyl, aryl, substituted aryl, halide, amino and thioether and combinations thereof, and optionally any adjacent $R_1$ to $R_5$ are linked together to form a 5-membered or 6-membered ring, and wherein n is an integer from 0 to 2, preferably an integer from 1 to 2, more preferably n is 1.

Preferably, R is selected from the group consisting of hydrogen, methyl, ethyl, iso-propyl, n-butyl, sec-butyl, iso-butyl and tert-butyl, and $R_1$ to $R_5$ are independently selected from the group consisting of hydrogen, chlorine, methyl, ethyl, n-propyl, iso-propyl, n-butyl, sec-butyl, iso-butyl and tert-butyl, and n is 1.

Still more preferably, R is hydrogen and $R_1$ to $R_5$ are independently selected from the group consisting of hydrogen, chlorine, methyl, ethyl, n-propyl, iso-propyl, n-butyl, sec-butyl, iso-butyl and tert-butyl, and n is 1.

Yet more preferably, R is hydrogen and $R_1$ to $R_5$ are independently selected from the group consisting of hydrogen, chlorine, methyl, ethyl, and tert-butyl, and n is 1.

It should be noted that although only the 1,3:2,4 isomer is represented, this structure is provided for convenience and illustration only and the invention is not limited to only isomers of the 1,3:2,4 type, but includes any other isomers, such as the 3,5:4,6 type or the 2,4:3,5 type.

It is preferred that the one or more clarifying agent(s) (D) is selected from the group consisting of 1,3:2,4 bis(dibenzylidene)sorbitol, 1,3:2,4 bis(4-methylbenzylidene)sorbitol, 1,3:2,4 bis(4-ethylbenzylidene)sorbitol, 1,3:2,4 bis(3,4-dimethylbenzylidene)sorbitol, and 1,3:2,4 bis(3-chloro-benzylidene) sorbitol, and mixtures thereof and mostly preferred from 1,3:2,4-bis(3,4-dimethylbenzylidene) sorbitol (DMDBS).

It is preferred that apart from the one or more clarifying agent(s) (D) as defined above or below the polymer composition of the present invention does not include further components which act as nucleating agent for the polyolefin (A). In another embodiment the polymer composition can comprise pigments which act as nucleating agents for the polyolefin (A) as additional nucleating agent in the polymer composition.

It is preferred that the polymer composition according to the present invention comprises one clarifying agent (D).

The one or more clarifying agent(s) (D), preferably one clarifying agent (D), as defined above is/are preferably present the polymer composition in an amount of from 100 ppm to 5000 ppm, more preferably of from 200 ppm to 2500 ppm, still more preferably of from 250 ppm to 1000 ppm and most preferably of from 300 ppm to 500 ppm, based on the total weight amount of the polymer composition.

Dispersing Agent (E)

The one or more dispersing agent(s) (E) present in the polymer composition can be any compound suitable for dispersing the fluoropolymer (C) in the polyolefin (A). Usually the one or more dispersing agent(s) (E) includes polar groups and non-polar groups.

Preferably, the one or more dispersing agent(s) (E) is selected from polymers having polar groups and non-polar groups.

Suitable dispersing agents are preferably selected from the group consisting of polyalkylene oxides, polycaprolactone diols or mixtures thereof, more preferably from polyalkylene oxides.

Preferably the one or more dispersing agent(s) (E) is/are selected from the group consisting of polyethylene oxides, polypropylene oxides, polyethylene glycol, polypropylene glycol or mixtures thereof, more preferably from polyethylene oxides, polyethylene glycol or mixtures thereof and mostly preferred from polyethylene glycol.

The molecular weight of the polymers having polar groups and non-polar groups is not very limited. The number average molecular weight Mn of the polymers having polar groups and non-polar groups is preferably in the range of from 500 g/mol to 50000 g/mol, more preferably in the range of from 1000 g/mol to 20000 g/mol, most preferably in the range of from 1500 g/mol to 10000 g/mol.

It is preferred that the polymer composition according to the present invention comprises one dispersing agent (E).

The one or more dispersing agent(s) (E), preferably one dispersing agent (E), as defined above is/are present the polymer composition in an amount of equal to or more than 100 ppm, preferably from 100 ppm to 750 ppm, more preferably of from 110 ppm to 500 ppm, still more preferably of from 120 ppm to 300 ppm and most preferably of from 130 ppm to 200 ppm, based on the total weight amount of the polymer composition.

Polymer Composition

The polymer composition according to the present invention comprises
(A) a polyolefin;
(B) one or more impact modifier(s);
(C) one or more fluoropolymer(s);
(D) one or more clarifying agent(s); and
(E) one or more dispersing agent(s) in an amount of equal to or more than 100 ppm, based on the total weight amount of the polymer composition.

Thereby, the components (A), (B), (C), (D) and (E) present in the polymer composition are preferably as defined above or below.

In addition to the components (A), (B), (C), (D) and (E) the polymer composition can comprise further components such as additives or additional polymeric components.

It is preferred that the polymer composition does not contain other polymeric components other than defined for components (A), (B), (C), (D) and (E).

In addition to components (A), (B), (C), (D) and (E) the polymer composition may comprise and preferably comprises usual additives for utilization with polyolefins, such as stabilizers (e.g. antioxidant agents), metal scavengers and/or UV-stabilizers, antistatic agents and utilization agents (such as processing aid agents). Preferably, the amount of these additives is 10 wt % or below, more preferably 9 wt % or below, more preferably 7 wt % or below, of the polymer composition.

Further preferred, the amount of additives different from pigments is 0 wt % to 1 wt %, more preferably 0.001 wt % to 0.8 wt %, based on the total amount of the polymer composition.

Depending on the application the polymer composition can comprise pigments.

In the case that pigments are present in the polymer composition, the polymer composition preferably comprises pigments in an amount of 1.0 to 10 wt %, preferably 1.5 to 9.0 wt %, more preferably 1.8 to 8.0 wt %, still more preferably 1.8 to 7.0 wt %, and most preferably 1.8 to 6.0 wt %, based on the total amount of the polymer composition.

Pigments can be added to polymer composition as such (neat) or in form of so-called master batch (MB), in which the pigment, and optionally further additives as defined above, are contained in concentrated form in a carrier polymer.

The optional carrier polymer of the masterbatch is not calculated to the amount of the polymer components present in the polymer composition. In other words, it is to be understood that pigment and optional additive(s) may be added to the polymer composition in form of a masterbatch, i.e. together with a carrier polymer. In such case the carrier polymer is not considered as polymer component(s), but is calculated into the amount (wt %) of pigment or, respectively, into the amount (wt %) of additive(s).

The amount of the optional carrier polymer of the master batch is 0 to 5 wt % based on the total amount of the polymer composition.

Suitably, carbon black is added in molding applications such as for colored molded articles.

For other applications such as blow molding applications no pigment is added to the polymer compositions. In these embodiments the polymer compositions usually include additives other than pigment as defined above in an amount of 0 wt % to 1 wt %, more preferably 0.001 wt % to 0.8 wt %, based on the total amount of the polymer composition.

It is preferred that the polymer composition according to the invention further comprises one or more fatty acid salt(s), such as one or more stearate(s) as additive. Preferably the fatty acid salt(s) is selected from zinc fatty acid salt(s), from earth alkali fatty acid salt(s) or mixtures thereof.

Especially preferred are zinc stearate, calcium stearate or mixtures thereof. Mostly preferred is calcium stearate.

When using a sorbitol based clarifying agent as clarifying agent (B) said clarifying agent (B) can exhibit a poor solubility in the polyolefin (A), especially in polypropylene, and process temperatures of more than 220° C. are required to dissolve sufficient amounts. It has surprisingly been found that by using fatty acid salts, like stearates, in the polymer composition according to the present invention, the dissolution properties of the sorbitol based clarifying agent in the polyolefin (A) can be significantly improved.

It is preferred that the polymer composition according to the present invention comprises one fatty acid salt.

The one or more fatty acid salt(s), preferably one fatty acid salt, as defined above is/are preferably present the polymer composition in an amount of from 0 ppm to 5000 ppm, more preferably of from 100 ppm to 2500 ppm, still more preferably of from 200 ppm to 1000 ppm and most preferably of from 300 ppm to 600 ppm, based on the total weight amount of the polymer composition.

The polymer composition has a melt flow rate $MFR_2$ (230° C., 2.16 kg) of from 1.0 g/10 min to 5.0 g/10 min, more preferably of from 1.5 g/10 min to 3.5 g/10 min, and most preferably of from 1.7 g/10 min to 2.5 g/10 min, determined according to ISO 1133.

Preferably the polymer composition comprises
- (A) equal to or more than 85 wt %, more preferably from 85 wt % to 96 wt %, still more preferably from 90 wt % to 95 wt % of a polyolefin;
- (B) equal to or less than 6.0 wt %, more preferably from 4.0 to 6.0 wt %, still more preferably from 4.5 to 5.5 wt % of one or more impact modifier(s);
- (C) from 100 ppm to 1000 ppm, more preferably of from 150 ppm to 750 ppm, still more preferably of from 200 ppm to 500 ppm and most preferably of from 250 ppm to 400 ppm of one or more fluoropolymer(s);
- (D) from 100 ppm to 5000 ppm, more preferably of from 200 ppm to 2500 ppm, still more preferably of from 250 ppm to 1000 ppm and most preferably of from 300 ppm to 500 ppm of one or more clarifying agent(s);
- (E) from 100 ppm to 750 ppm, more preferably of from 110 ppm to 500 ppm, still more preferably of from 120 ppm to 300 ppm and most preferably of from 130 ppm to 200 ppm of one or more dispersing agent(s), and and optionally additives as defined above,
wherein all weight amounts are based on the total weight amount of the polymer composition.

It is preferred that the weight ratio of the one or more fluoropolymer(s) (C) to the one or more dispersing agent(s) (E) in the polymer composition is in the range of from 1:1 to 5:1, more preferably of 1.2:1 to 4:1 and most preferably of from 1.5:1 to 2.5:1. Especially preferred is a weight ratio of the one or more fluoropolymer(s) (C) to the one or more dispersing agent(s) (E) in the polymer composition of 2:1.

The total amount of components (C), (D) and (E) as defined above or below in the polymer composition usually does not exceed 10000 ppm, preferably is in the range of from 300 ppm to 5000 ppm, more preferably in the range of from 500 ppm to 2500 ppm and most preferably in the range of from 750 ppm to 1500 ppm, based on the total weight amount of the polymer composition.

It is especially preferred that the polymer composition comprises
- (A) equal to or more than 85 wt %, more preferably from 85 wt % to 96 wt %, still more preferably from 90 wt % to 95 wt % of a multimodal propylene random copolymer;
- (B) equal to or less than 6.0 wt %, more preferably from 4.0 to 6.0 wt %, still more preferably from 4.5 to 5.5 wt % of a multimodal copolymer of ethylene with at least two different comonomer units selected from alpha-olefins having from 3 to 12 carbon atoms;
- (C) from 100 ppm to 1000 ppm, more preferably of from 150 ppm to 750 ppm, still more preferably of from 200 ppm to 500 ppm and most preferably of from 250 ppm to 400 ppm of a terpolymer of vinylidene fluoride, tetrafluoroethylene, and hexafluoropropylene;
- (D) from 100 ppm to 5000 ppm, more preferably of from 200 ppm to 2500 ppm, still more preferably of from 250 ppm to 1000 ppm and most preferably of from 300 ppm to 500 ppm of 1,3:2,4-bis(3,4-dimethylbenzylidene) sorbitol (DMDBS);
- (E) from 100 ppm to 750 ppm, more preferably of from 110 ppm to 500 ppm, still more preferably of from 120 ppm to 300 ppm and most preferably of from 130 ppm to 200 ppm of polyethylene glycol, and optionally additives as defined above,
wherein all weight amounts are based on the total weight amount of the polymer composition.

The polymer composition is preferably prepared by melt-mixing the components. The melted composition can then either be compounded and pelletized as known in the art or directly further processed to articles comprising the polymer composition according to the invention.

The extrusion may be conducted in the manner generally known in the art, preferably in a twin screw extruder. One example of suitable twin screw extruders is a co-rotating twin screw extruder. Those are manufactured, among others, by Coperion or Japan Steel Works. Another example is a counter-rotating twin screw extruder. Such extruders are manufactured, among others, by Kobe Steel and Japan Steel Works.

The extruders typically include a melting section where the polymer is melted and a mixing section where the polymer melt is homogenised. Melting and homogenisation are achieved by introducing energy into the polymer. Suitable melting temperatures are from about 190 to about 250° C., preferably from 200 to 225° C.

Suitable melting pressures are from about 100 to about 170 bar, preferably from 1100 to 150 bar.

The polymer composition is especially suitable for the production of blow molded articles with an improved balance of optical properties such as low haze and high gloss, good processability and good mechanical properties especially in regard of impact strength.

From the examples it can be seen that the improvement of the optical properties results from the combination of clarifying agent (D), the fluoropolymer (C) and surprisingly the dispersing agent (E) contrary to the teaching of WO 2010/

138172. The processability of the polymer composition resulting in a high throughput at mild conditions in the post-production processing is mainly influenced by the melt flow rate of the polymer composition.

The mechanical properties, especially the impact strength is mainly influenced by the presence of the impact modifier (B). Thereby, it has been found that even a low amount of impact modifier of equal to or less than 6.0 wt % significantly improves the impact properties of the polymer composition and the resulting articles without impairing their stiffness and optical properties.

Articles

The present invention further relates to an article comprising the polymer composition of the invention as defined above or below.

The article preferably is a blow molded article. It is especially preferred that the article is an extrusion blow molded (ESM) bottle.

The article, preferably the extrusion blow molded (ESM) bottle, preferably has a haze of not more than 35.0%, more preferably of not more than 34.5% and most preferably of not more than 34.0%, measured according to ASTM D 1003. The lower limit of the haze is usually not lower than 25%.

Further, the article, preferably the extrusion blow molded (ESM) bottle, preferably has a gloss at an angle of 20° C. on the inner side of the article or bottle of at least 31.0%, more preferably at least 32.0% and most preferably at least 34.0%. The lower limit of the gloss at an angle of 20° C. on the inner side of the article or bottle is usually not higher than 50%.

Additionally the article, preferably the extrusion blow molded (ESM) bottle, preferably has a gloss at an angle of 20° C. on the outer side of the article or bottle of at least 32.0%, more preferably at least 33.0% and most preferably at least 35.0%. The lower limit of the gloss at an angle of 20° C. on the outer side of the article or bottle is usually not higher than 50%.

Further, the article, preferably the extrusion blow molded (ESM) bottle, preferably has a gloss at an angle of 60° C. on the inner side of the article or bottle of at least 93.0%, more preferably at least 94.0% and most preferably at least 94.5%. The lower limit of the gloss at an angle of 60° C. on the inner side of the article or bottle is usually not higher than 110%.

Additionally the article, preferably the extrusion blow molded (ESM) bottle, preferably has a gloss at an angle of 60° C. on the outer side of the article or bottle of at least 93.0%, more preferably at least 93.5% and most preferably at least 94.0%. The lower limit of the gloss at an angle of 60° C. on the outer side of the article or bottle is usually not higher than 110%.

Preferably, the article or bottle has only very small differences between the gloss on the inner side and the outer side of the article or bottle.

Consequently, the article, preferably the extrusion blow molded (ESM) bottle, preferably has a bottle quality index at an angle of 20° (BQI-20) of at least 1.50, more preferably of at least 1.55 and most preferably of 1.60, calculated as follows:

$$\text{BQI-20} = \log((\text{gloss 20 IN} \cdot \text{gloss 20 OUT} \cdot \text{thickness})/\text{haze}).$$

The lower limit of the BQI-20 usually does not exceed 2.0.

Further, the article, preferably the extrusion blow molded (ESM) bottle, preferably has a bottle quality index at an angle of 60° (BQI-60) of at least 2.40, more preferably of at least 2.45 and most preferably of at least 2.48, calculated as follows:

$$\text{BQI-60} = \log((\text{gloss 60 IN} \cdot \text{gloss 60 OUT} \cdot \text{thickness})/\text{haze}).$$

The lower limit of the BQI-60 usually does not exceed 3.0.

Further, the article, preferably the extrusion blow molded (ESM) bottle, preferably has a combined bottle quality index (BQF) of at least 2.50, more preferably of at least 2.52, and most preferably of at least 2.54, calculated as follows:

$$\text{BQF} = \log(((\text{gloss 20 IN} \cdot \text{gloss 20 OUT}) + (\text{gloss 60 IN} \cdot \text{gloss 60 OUT}) \cdot \text{thickness})/\text{haze}).$$

The lower limit of the BQF usually does not exceed 3.0.

Still further, the article, preferably the extrusion blow molded (ESM) bottle, preferably has a yellowness index of not more than 4.0, more preferably not more than 3.5 and most preferably not more than 3.2.

The lower limit of the yellowness index usually does not exceed 2.0.

EXAMPLES

1. Determination Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer.

The $\text{MFR}_2$ of polyethylene is measured at a temperature of 190° C. and a load of 2.16 kg.

The $\text{MFR}_2$ of polypropylene is measured at a temperature of 230° C. and a load of 2.16 kg.

The $\text{MFR}_5$ of a fluoropolymer is measured at a temperature of 265° C. and a load of 5 kg.

The $\text{MFR}_2$ of polymer composition is measured at a temperature of 230° C. and a load of 2.16 kg.

b) Density

Density of the polymer was measured according to ISO 1183-1:2004 Method A on compression moulded specimen prepared according to EN ISO 1872-2 (February 2007) and is given in $kg/m^3$.

c) Description/Dimension of the Bottles 750 ml bottles having a wall thickness of 1.14-1.19 mm and a bottle weight of 50 g±0.5 g were prepared from pre-mixed polymer compositions in Krupp Kautex extrusion blow moulding machine with a 50×25D screw having a diameter of 15 mm. The conditions are given for each polymer composition in the example section.

d) Haze Measurement on Bottles

Instrument: Haze-gard plus from BYK-Gardner

Testing: according to ASTM D1003 (as for injection molded plates)

Method: The measurement is done on the outer wall of the bottles. The top and bottom of the bottles are cut off. The resulting round wall is then split in two, horizontally. Then from this wall six equal samples of app. 60×60 mm are cut from close to the middle. The specimens are placed into the instrument with their convex side facing the haze port. Then the transparency, haze and clarity are measured for each of the six samples and the haze value is reported as the average of these six parallels.

e) Gloss Measurement on Bottles

Instrument: Sceen TRI-MICROGLOSS 20-60-80 from BYK-Gardner 20

Testing: ASTM D 2457 (as for injection molded plates)

The bottles: It is measured on the wall of the bottles. The top and bottom of the bottles is cut off. This round wall is then split in two, horizontally. Then this wall is cut into six equal 25 samples of app. 90×90 mm, just to fit into a special light trap made for testing on injection molded parts. Then the gloss at 20° is measured on these six samples, and the average value is reported as gloss at 20° and the gloss at 60° is measured on these six samples, and the average value is reported as gloss at 60° each on the inner side of the bottle and the outer side of the bottle.

f) Bottle Quality Indices

The bottle quality indices are calculated from the gloss at the inner side of the bottle and the outer side of the bottle, the haze and the wall thickness of the bottle as follows:

BQI-20=log((gloss 20 IN·gloss 20 OUT·thickness)/haze)

BQI-60=log((gloss 60 IN·gloss 60 OUT·thickness)/haze)

BQF=log(((gloss 20 IN·gloss 20 OUT)+(gloss 60 IN·gloss 60 OUT)·thickness)/haze)

2. Components

The following components were used for the polymer compositions of the examples:

RB307MO is a multimodal propylene random copolymer having a density of 905 kg/m$^3$ and a melt flow rate MFR$_2$ of 1.5 g/10 min, commercially available from Borouge Pte Ltd.

FK1820 Anteo™ FK1820 is a bimodal 1-butene/1-hexene/ethylene terpolymer LLDPE having a density of 918 kg/m$^3$ and a melt flow rate MFR$_2$ of 1.5 g/10 min, commercially available from Borouge Pte Ltd.

FX5911 3M™ Dynamar™ is a fluoropolymer and is believed to be a terpolymer of vinylidene fluoride, tetrafluoroethylene and hexafluoropropylene having a melt flow rate MFR5 of 6-14 g/10 min and a density of 1900 to 1960 kg/m$^3$, commercially available from 3M.

DMDBS DMDBS is a clarifying agent based on 1,3:2,4 Bis (3,4-di-methyl-benzylidene) sorbitol, commercially available from different suppliers PEG Pluriol 9000 E is a polyethylene glycol having an average molar mass (calculated from the OH number according to DIN 53240) of 9000 g/mol, commercially available from BASF SE 3. Polymer Compositions For inventive example IE1 and comparative examples CE1-CE3 the following polymer compositions were prepared as shown in Table 1. Thereby, depending on the composition FK1820, FX5911, DMDBS and PEG are mixed with RB307MO in the given amounts. The amount of RB307MO then makes up to 100 wt % of accordant the polymer compositions.

TABLE 1

Polymer compositions of examples IE1 and CE1-CE3

| Components | CE1 | CE2 | CE3 | IE1 |
|---|---|---|---|---|
| RB307MO | 100 wt % | up to 100 wt % | up to 100 wt % | up to 100 wt % |
| FK1820 | — | — | — | 5 wt % |
| FX5911 | — | 300 ppm | 300 ppm | 300 ppm |
| DMDBS | — | 400 ppm | 400 ppm | 400 ppm |
| PEG | — | — | 150 ppm | 150 ppm |

4. Bottles

The polymer compositions of examples IE1 and CE1-CE3 were mixed and then compounded to extrusion blow molded EBM bottles using the conditions as disclosed in Table 2.

TABLE 2 processing conditions for preparation of EBM bottles

| Processing parameters | | CE1 | CE2 | CE3 | IE1 |
|---|---|---|---|---|---|
| Extruder speed (actual) | 1/min | 14.5 | 14.9 | 15.1 | 15.7 |
| Extruder motor torque | % | 27.2 | 26.5 | 25.4 | 25.7 |
| Melt Temp | ° C. | 209 | 210 | 209 | 209 |
| Melt Pressure | bar | 136 | 130 | 129 | 129 |
| Basic gap | Mm | 270 | 251 | 248 | 195 |
| Cooling temp | ° C. | 15 | 15 | 15 | 15 |
| Cycle time | s | 20.1 | 20.0 | 20.0 | 20.0 |
| Av. Bottle weight | g | 49.6 | 49.6 | 49.6 | 49.6 |
| Av. Bottle thickness | mm | 1.17 | 1.18 | 1.14 | 1.16 |
| Basic WTC | | 270 | 251 | 248 | 195 |
| Profile WTC | | 100 | 100 | 100 | 100 |
| Av Bottle Scrap Length | Mm | 40 | 40 | 40 | 40 |
| Extruder Temperature - T1 | ° C. | 200 | 200 | 200 | 200 |
| Extruder Temperature - T2 | ° C. | 195 | 195 | 195 | 195 |
| Extruder Temperature - T3 | ° C. | 190 | 190 | 190 | 190 |
| Collar Temerature - T4 | ° C. | 190 | 190 | 190 | 190 |
| Die head Temperature - T5 | ° C. | 200 | 200 | 200 | 200 |
| Die head Temperature - T6 | ° C. | 200 | 200 | 200 | 200 |
| Die head Temperature - T7 | ° C. | 200 | 200 | 200 | 200 |
| Die head Temperature - T8 | ° C. | 200 | 200 | 200 | 200 |

The bottles prepared from the polymer compositions of examples IE1 and CE1-CE3 have the following optical properties as disclosed in Table 3.

TABLE 3 optical properties of the EBM bottles of IE1 and CE1-CE3

| | | CE1 | CE2 | CE3 | IE1 |
|---|---|---|---|---|---|
| Haze | % | 20.5 | 34.2 | 33.4 | 33.8 |
| Gloss IN at 20° | % | 15.0 | 31.1 | 30.5 | 35.0 |
| Gloss OUT at 20° | % | 29.6 | 31.3 | 33.4 | 37.2 |
| Gloss IN at 60° | % | 62.7 | 92.9 | 94.2 | 95.0 |
| Gloss OUT at 60° | % | 83.0 | 94.4 | 94.4 | 94.4 |
| Yellowness index | | 2.10 | 2.22 | 2.32 | 3.09 |
| BQI-20 | | 1.404 | 1.526 | 1.541 | 1.650 |
| BQI-60 | | 2.473 | 2.481 | 2.482 | 2.488 |
| BQF | | 2.527 | 2.527 | 2.529 | 2.547 |

From comparison of examples CE2 and CE3 it can be seen that the addition of a dispersing agent like polyethylene glycol to the polymer composition slightly improves the optical properties of the bottles. Additionally, the dispersing agent has a positive effect on the dispersion of the fluoropolymer in the polymer melt which increases the homogeneity of the polymer melt as the bottles prepared from the polymer composition of CE3 have significantly lower amounts of gels compared to the bottles prepared from the polymer composition of CE2.

The addition of the impact modifier FK1820 does not significantly influence the haze of the bottles made from the polymer compositions of IE1 compared to the bottles made from the polymer compositions of CE3. However, the impact modifier FK1820 significantly increases the impact properties of the bottles.

The invention claimed is:

1. A polymer composition comprising:
   (A) from 85 to 96 wt % of a multimodal propylene random copolymer;
   (B) from 4.0 to 6.0 wt % of a multimodal copolymer of ethylene with one or more comonomer units selected from alpha-olefins having from 4 to 8 carbon atoms;
   (C) from 150 to 750 ppm of a terpolymer of vinylidene fluoride, tetrafluoroethylene, and hexafluoropropylene;

(D) from 250 to 1000 ppm of 1,3:2,4-bis(3,4-dimethylbenzylidene) sorbitol (DMDBS); and (E) from 130 to 300 ppm of polyethylene glycol, wherein all weight amounts are based on the total weight amount of the polymer composition.

2. The polymer composition according to claim 1, wherein the weight ratio of the terpolymer of vinylidene fluoride, tetrafluoroethylene, and hexafluoropropylene (C) to the polyethylene glycol (E) in the polymer composition is in the range of from 1.2:1 to 4:1.

3. The polymer composition according to claim 1 having a melt flow rate $MFR_2$ (2.16 kg, 230° C.) of from 1.0 to 5.0 g/10 min.

4. An article comprising the polymer composition according to claim 1.

5. The article according to claim 4 being a blow molded article.

6. The article according to claim 4 being an extrusion blow molded (EBM) bottle.

7. The article according to claim 6 having a haze of not more than 35.0%, measured according to ASTM D 1003.

8. The article according to claim 6 having a gloss at an angle of 20° C. on the inner side of the bottle of at least 31.0% and/or a gloss at an angle of 20° C. on the outer side of the bottle of at least 32.0%.

9. The article according to claim 6 having gloss at an angle of 60° C. on the inner side of the bottle of at least 94.0% and/or a gloss at an angle of 60° C. on the outer side of the bottle of at least 93.0%.

10. The article according to claim 6 having at least one of the following properties:

a bottle quality index at an angle of 20° (BQI-20) of at least 1.54, calculated as follows:

$$BQI\text{-}20 = \log((\text{gloss 20IN} \cdot \text{gloss 20 OUT} \cdot \text{thickness})/\text{haze});$$

a bottle quality index at an angle of 60° (BQI-60) of at least 2.48, calculated as follows:

$$BQI\text{-}60 = \log((\text{gloss 60IN} \cdot \text{gloss 60OUT} \cdot \text{thickness})/\text{haze});$$

and/or a combined bottle quality index (BQF) of at least 2.53, calculated as follows:

$$BQF = \log(((\text{gloss 20 IN} \cdot \text{gloss 20 OUT}) + (\text{gloss 60IN} \cdot \text{gloss 60 OUT}) \cdot \text{thickness})/\text{haze}).$$

* * * * *